United States Patent [19]
Harada et al.

[11] Patent Number: 5,078,495
[45] Date of Patent: Jan. 7, 1992

[54] MONOCHROMATOR

[75] Inventors: Tatsuo Harada, Fuchu; Toshiei Kurosaki, Katsuta; Tsuneo Terasawa, Hachioji; Toshiaki Kita, Nishitama, all of Japan

[73] Assignee: Hitachi, Ltd., Tokyo, Japan

[21] Appl. No.: 478,568

[22] Filed: Feb. 12, 1990

[30] Foreign Application Priority Data

Feb. 17, 1989 [JP] Japan .................................. 1-36126

[51] Int. Cl.⁵ ............................ G01J 3/18; G02B 5/18
[52] U.S. Cl. ..................................... 356/334; 359/569
[58] Field of Search ....................... 356/331–334, 356/324, 326, 328, 305; 350/162.17, 162.2, 162.21, 162.23

[56] References Cited
PUBLICATIONS

"Webster's New Collegate Dictionary," pp. 664, 1977.
"A Grazing Incident Monochromator with a Varied-Space Plane Grating . . ." Harada et al., SPIE, vol. 503, 1984, pp. 114–118.
"High Resolution Gratings for the Soft X-Ray," Hettrick, Nuclear Instruments and Methods, 1988, pp. 404–413.
"Aberration-Corrected Plane Gratings," Thevenon et al., SPIE, vol. 815, 1984.
Proceedings of SPIE, vol. 815, (1987) pp. 136–145, 96–101.
Journal of Optical Society of America, vol. 54, 1964, pp. 879–889.
Proceedings of SPIE, vol. 815, 1988, pp. 96–101, 136–142.

Primary Examiner—F. L. Evans
Assistant Examiner—K. P. Hantis
Attorney, Agent, or Firm—Fay, Sharpe, Beall, Fagan, Minnich & McKee

[57] ABSTRACT

A plane grating, particularly for a monochronomator, is provided with varied-spaced straight and parallel grooves in a light beam path to compensate for other light affecting components, for example a spherical mirror used for collimating or focusing the light beam. The angle of incidence with respect to the light for each of the grooves may vary and the angle of diffraction with respect to the light for each groove may be required to vary with the imperfection of collimation and focusing of the beam. The grooves are varied in their spacing to compensate for the variation of both incidence and diffraction direction.

7 Claims, 5 Drawing Sheets

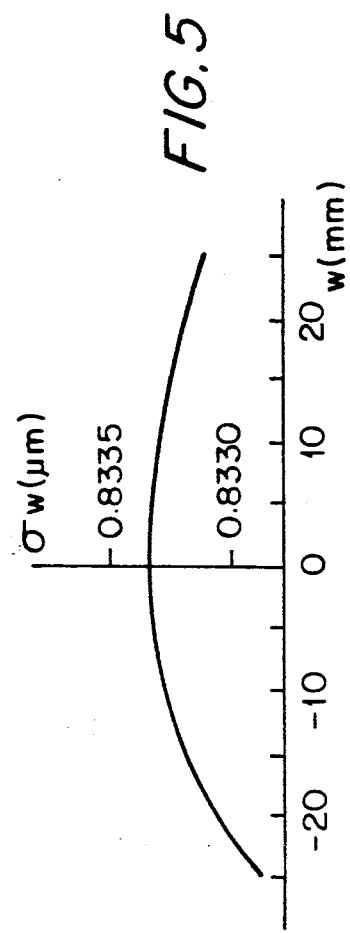
FIG. 4
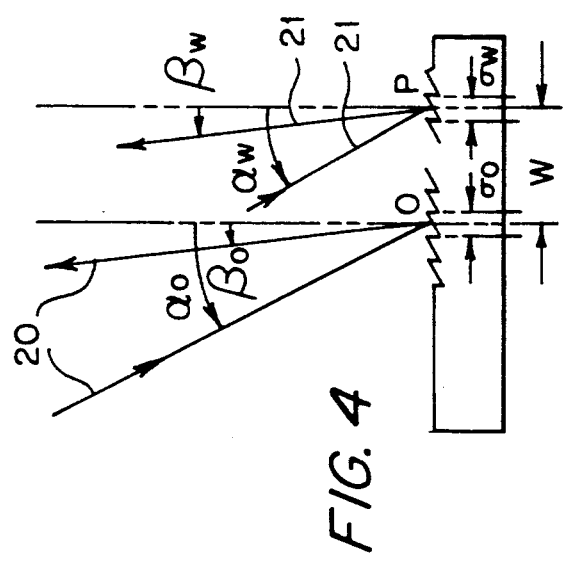
FIG. 5
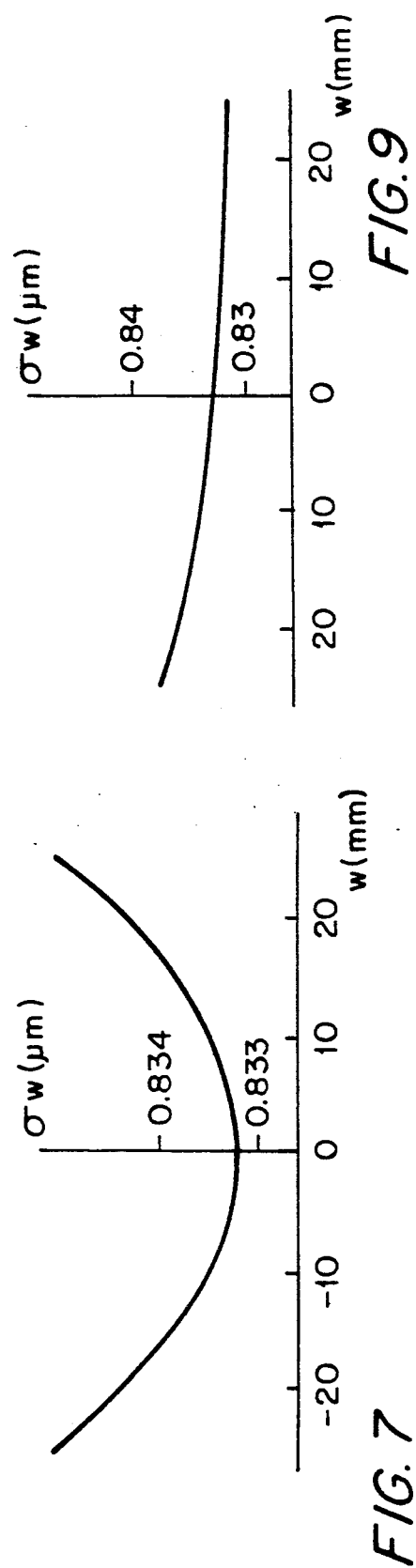
FIG. 7
FIG. 9

MONOCHROMATOR

BACKGROUND

This invention relates to spectroscopic analytical instruments and spectroscopic measuring instruments, and more particularly to monochromators suitable for spectroscopy with high resolution.

Plane grating monochromators have gained a wide application in the field of spectroscopic analysis, and the like. An example of a conventional Czerny-Turner monochromator which is believed to have relatively high resolution is shown in FIG. 2. Diverging beam 11 leaving an entrance slit 1 is converted to a parallel beam 12 by a spherical mirror 2. The beam 12 is converted to a monochromatic component beam 13 among the incident beams dispersed by a plane grating 6. The beam 13 is converted to a converging beam 14 by a spherical mirror 4 and passes through an exit slit 5. If the plane grating 6 is rotated at this time, the wavelength of the monochromatic beam passing through the exist slit 5 can be changed. The spherical mirror used hereby do not have the perfect collimation property of the diverging beam and perfect focusing property of the parallel beam that a paraboloidal mirror has. Therefore, each monochromatic spectral image converged onto the exist slit plane including exit slit and (a plane normal to the principal ray) has aberrations such as astigmatism, coma-type aberration, spherical aberration, and the like, and they impose limitations on the spectral characteristics of the monochromator.

The Czerny-Turner monochromator shown in FIG. 2 is discussed in Journal of the Optical of America, Vol. 54(1964), pp. 879-887. In this monochromator, the reduction of coma-type aberration in a predetermined wavelength region can be made by selecting the radii of curvature of the spherical mirrors or the incidence angles to them, and high resolution of the monochromator has been accomplished ordinarily in accordance with this method. However, this aberration reduction method is effective only in the proximity of a specific spectral wavelength to be dealt with, and has a small effect for the monochromator application which scans a wide wavelength region.

Recently, holographic grating whose grooves are formed by forming interference fringes by interference of laser beams and processing photographically the interference fringes has been put into practical application. In this case, aberration in the monochromator can be reduced by suitably selecting the arrangement of the interference fringes. "Proceedings of SPIE", Vol. 815 (1987), pp. 136-145 attains high resolution of a Czerny-Turner monochromator by producing a plane grating having varied-spaced and curved grooves by the interference of laser beams with an aspheric wavefront utilizing a hologram and a plane wavefront.

In a Littrow monochromator shown in FIG. 3, a spherical mirror 2 exhibits both the functions of collimation of the incident beam and focusing of the diffraction beam. However, greater coma-type aberration occurs in this case than in the CzernyTurner monochromator shown in FIG. 2, and high resolution cannot be obtained, though the optical configuration is simple.

SUMMARY

In the abovementioned device of the "Proceedings of SPIE", the wavelength at which aberration can be removed is limited by the wavelength of the laser used for the fabrication of the grating. Therefore, this prior art technique is not suitable for the monochromator having its application range in an arbitrary wavelength region. The same reference, i.e. "Proceedings of SPIE", Vol. 815 (1987), pp. 96-101 fabricates a plane grating having varied-spaced and curved grooves by the interference of the laser beams with an aspheric wavefront reflected from spherical mirrors and attains high resolution of a Czerny-Turner monochromator, but this technique, too, is limited by the laser beam used and does not have versatility.

It is an object of the present invention to eliminate and/or reduce various kinds of aberrations resulting from the use of a spherical mirror in conventional plane grating monochromators and to improve performance.

The objects described above can be accomplished by use of a plane grating having varied-spaced, straight and parallel grooves in place of conventional equally-spaced grooves.

BRIEF DESCRIPTION OF THE DRAWINGS

Further objects, features and advantages of the present invention will become more clear upon the following detailed description of preferred embodiments as shown in the drawing, wherein:

FIG. 4 is an explanatory view of an incidence direction and a diffraction direction to a diffraction grating of the present invention;

FIG. 5 is an explanatory view showing groove spacings for reducing a coma-type aberration and spherical aberration in the Czerny-Turner monochromator of the present invention;

FIGS. 6 D, E and F are graphs of comparison data of spectral image focusing property of the grating with the varied-spaced groove spacings of the present invention in the Czerny-Turner monochromator;

FIG. 7 is an explanatory view showing the space variation to reduce the coma-type aberration and spherical aberration in the Littrow monochromator of the present invention;

FIG. 8 B is an explanatory view showing spectral image focusing property of the grating with the varied-spaced groove spacings in one embodiment of the present invention in the Littrow monochromator (where the x axis corresponds to the direction of spectral dispersion and the y axis corresponds to normal dispersion on the exit plane);

FIG. 9 is an explanatory view showing the groove spacings of the grating for reducing the astigmatism, coma-type aberration and spherical aberration in the Littrow monochromator of the present invention.

DETAILED DESCRIPTION

Figure 1:
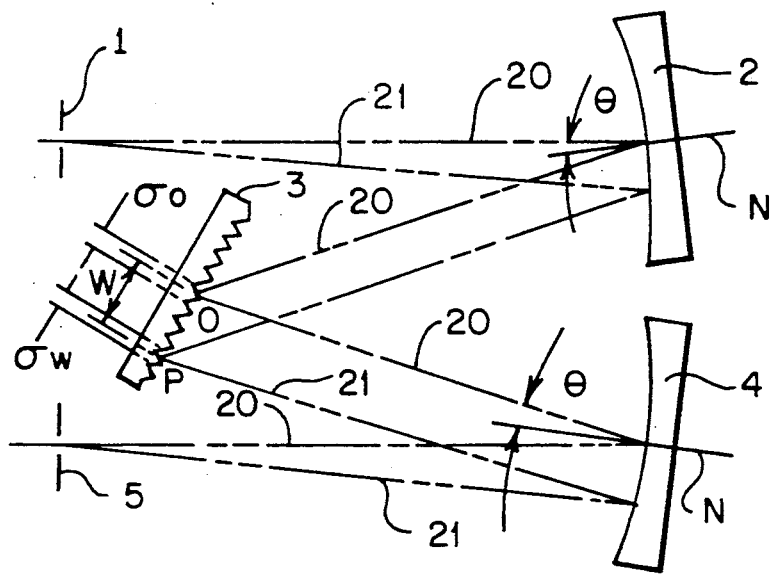
FIG. 1 is a plan view of a Czerny-Turner monochromator optical configuration in accordance with the present invention.
Figure 2:
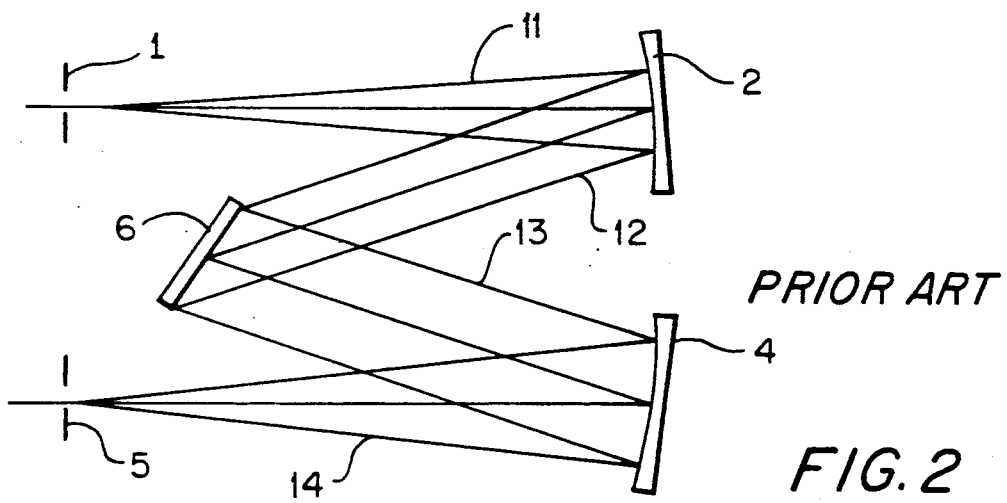
FIG. 2 is a plan view of a conventional CzernyTurner monochromator optical configuration.

In the optical configuration of the Czerny-Turner monochromator shown in FIG. 1, the principal ray 20 is emitted from the center of the entrance slit 1, is reflected at the center of the spherical mirror 2, reflected and diffracted at the center O of the diffraction grating 3, is reflected at the center of the spherical mirror 4 and passes through the center of the exit slit 5. An m-th order diffracted ray 20 having an arbitrary wavelength $\lambda$ has the following relation with the groove spacing $\sigma_o$ when the incidence angle to the grating is $\alpha_o$ and the diffraction angle is $\beta_o$ as shown in FIG. 4:

$$m\lambda = \sigma_o(\sin \alpha_o + \sin \beta_o)$$

In this case, a ray 21 which is emitted from the entrance slit 1, is reflected by the spherical mirror 2 and is incident to a point P having a distance W from the center O on the grating plane of the diffraction grating 3, and because of aberration by the spherical mirror 21; the incidence angle at the point P is $\alpha_w$ which is different from the incidence angle $\alpha_o$ at the center O of the diffraction grating. In order for the ray diffracted at the point P to be reflected by the spherical mirror 4 and to pass through the center of the exit slit, the diffraction angle at the point P must be $\beta_w$ which is different from the diffraction angle $\beta_o$ at the center, due to the aberration of the spherical mirror 4. To obtain such a diffracted beam, the groove spacing $\sigma_w$ at the point P, the incidence angle $\alpha_w$ and the diffraction angle $\beta_w$ must satisfy the following relation:

$$m\lambda = \sigma_w(\sin \alpha_w + \sin \beta_w)$$

Thus, if the diffraction grating having mutually different groove spacings corresponding to the positions on the plane of the grating is used, the m-th order diffracted beam having a wavelength $\lambda$ which is emitted from the center of the entrance slit 1, is converged to the center of the exit slit 5 on the plane including the centers of the spherical mirror 2 and spherical mirror 4 and diffraction grating 3. Such a plane grating having the varied-spaced grooves defined by the above relations can be made by use of a ruling engine which forms the grooves by controlling the groove spacings by numerical control, and such a ruling engine is disclosed in U.S. Pat. No. 4,012,843.

FIG. 5 shows the groove spacings in the varied-spaced grating in accordance with the present invention in the Czerny-Turner monochromator shown in FIG. 1. The radius of curvature R of each spherical mirror 2, 4 is 630 mm, the angle $\theta$ between the principal incident ray 20 to the center of each spherical mirror and the normal N to the center is 7°. The distances r1 and r2 between the entrance slit 1 and the center of the spherical mirror 2 and between the center of the spherical mirror 4 and the exit slit 5 are 312.652 mm, which is equal to R cos $\theta/2$. This is the arrangement of the optical configuration based on the image focusing condition of the spectrum. In this optical configuration, the plane grating has the varied-groove spacing $\sigma_w$ at the position of W (mm) from the center (with the center groove spacing $\sigma_o$ of 1/1200 mm) that satisfies the following relation, as shown in FIG. 5:

$$\sigma_w = 1/1,200(1 - 5.8 \times 10^{-7} W^2 + 9.0 \times 10^{-9} W^3)$$
$$(mm)$$

Figure 6A:
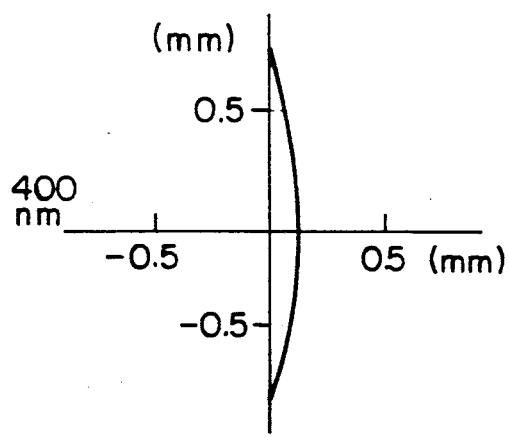
FIGS. 6 A, B and C are graphs of comparison data of the spectral image focusing property of a conventional grating with equally spaced groove spacings in the Czerny-Turner monochromator (where the x axis corresponds to the direction of spectral dispersion and the y axis corresponds to normal dispersion on the exit plane)
Figure 6D:
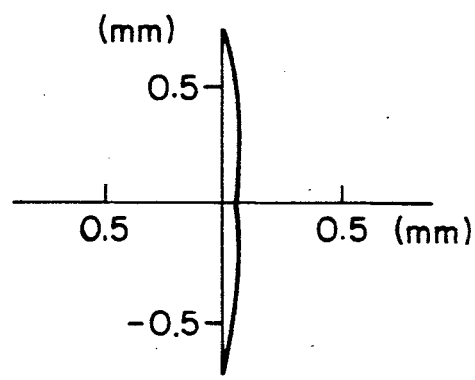
Figure 6B:
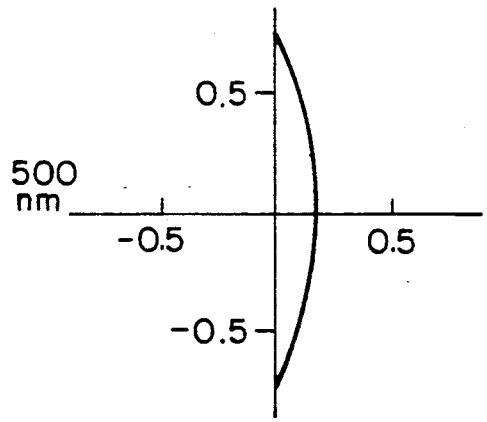
Figure 6E:
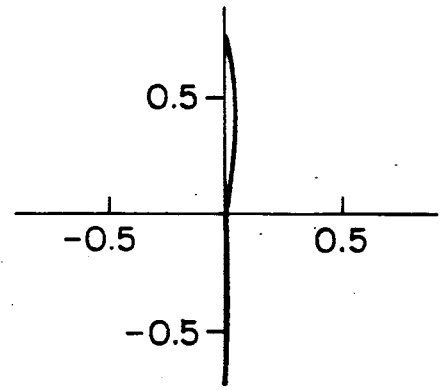
Figure 6C:
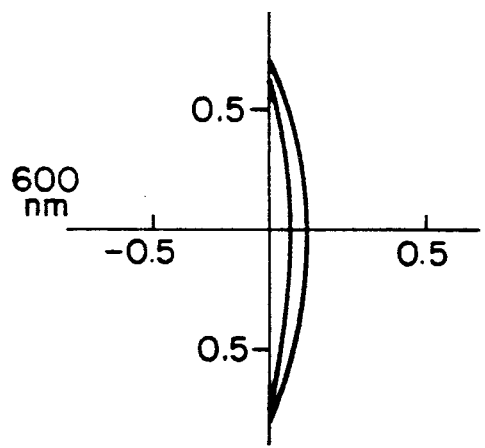
Figure 6F:
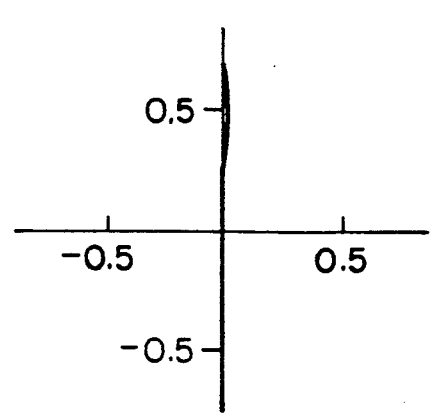
Figure 8A:
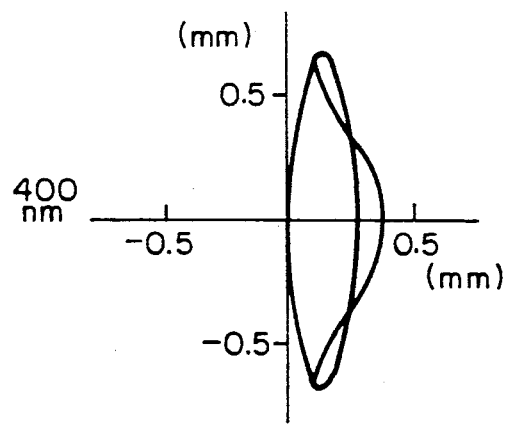
FIG. 8 A is an explanatory view showing spectral image focusing property of the conventional grating with equalty spaced groove spacings in one embodiment of the present invention in the Littrow monochromator (where the x axis corresponds to the direction of spectral dispersion and the y axis corresponds to normal dispersion on the exit plane)
Figure 8D:
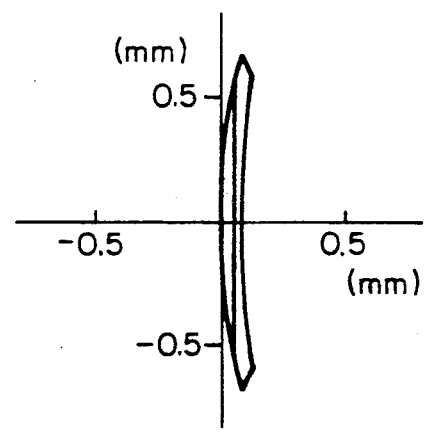
Figure 8B:
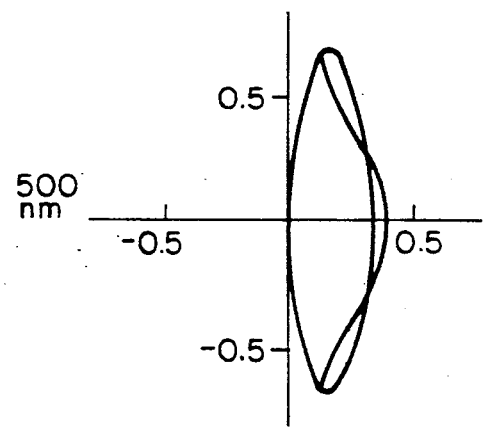
Figure 8E:
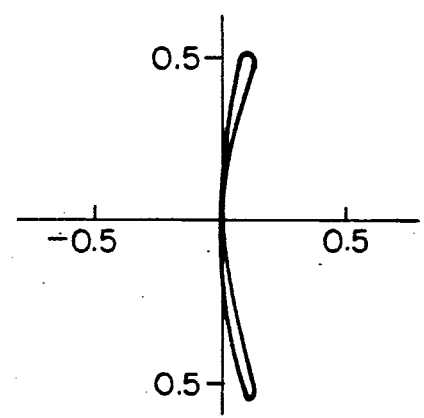
Figure 8C:
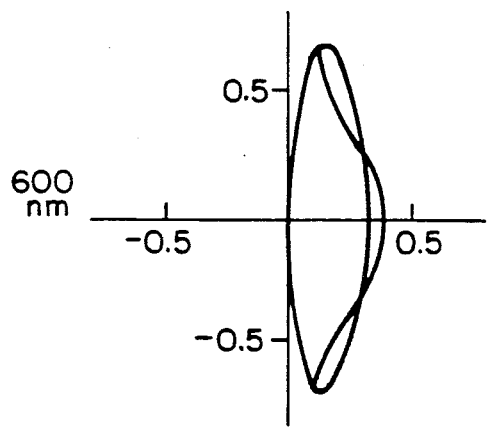
Figure 8F:
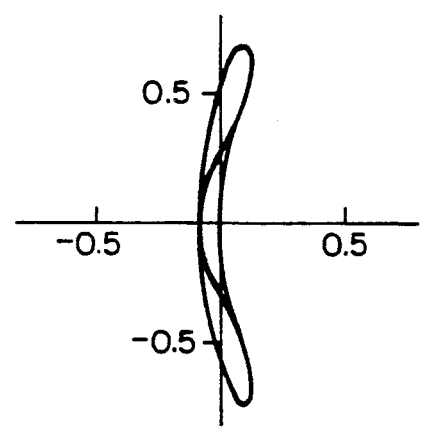

The plane grating has the varied-spaced groove spacings, and it can reduce the coma-type aberration and the spherical aberration of the spectral image as compared to the equally spaced grooves. The results of comparison of the spectral images of the first order spectrum (m=1) at each wavelength ($\lambda$) of 400, 500 and 600 nm for the Czerny-Turner monochromator using the conventional place grating having the equally spaced grooves are shown in FIGS. 6A, B, C and for the Czerny-Turner monochromator using the plane grating having the varied-spaced grooves of the present invention are shown in FIGS. 6D, E, F with the beam divergence of 50 mm diameter at the spherical mirror 2. A remarkable effect of improvement in resolution of the monochromator can be observed in this embodiment using the plane grating having the varied-spaced grooves of the present invention.

In the varied-spaced groove spacings described above, the coefficient of $W^2$ is associated with reduction of the coma-type aberration and the coefficient of $W^3$, with reduction of the spherical aberration.

Figure 3:
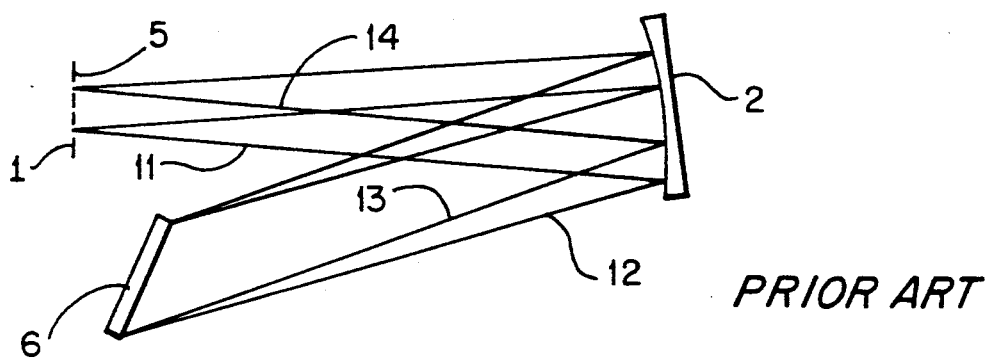
FIG. 3 is a plan view of a conventional Littrow monochromator optical configuration.

FIG. 7 shows the groove spacings in the varied-spaced grooves of the grating 3 in accordance with the present invention to be used in place of the grating 6 in the Littrow monochromator shown in FIG. 3. The radius of curvature R of the spherical mirror 2 is 630 mm. The entrance slit 1 and the exit slit 5 are assumed to be very close to each other. Each of the incident beam 11 and the diffracted beam 12, is incident to the spherical mirror 2 at an angle $\theta = 7°$ at the center. The distances r1 and r2 between the spherical mirror and the entrance slit and between the spherical mirror and the exit are set to 312.652 mm, which is equal to R cos $\theta/2$. In this optical configuration, the coma-type aberration and the spherical aberration of the spectral image for the first order spectrum at a wavelength of 500 nm can be reduced when the center groove spacing $\sigma_o$ is 1/200 mm and the groove spacing $\sigma_w$ at the position of distance W (mm) from the center is given by the following formula, as shown in FIG. 7:

$$\sigma_w = 1/1200(1 + 2.72 \times 10^{-6} W^2 - 9.75 \times 10^{-9} W^3)$$
$$(mm)$$

FIGS. 8 A-F shows the result of comparison of the spectral images by the first order spectrum at each wavelength of 400, 500 and 600 nm between a Littrow monochromator using the plane grating having the conventional equally spaced grooves (FIGS. 8A, B, C) and the Littrow monochromator using the plane grating having the varied-spaced grooves of the present invention (FIGS. 8D, E, F) with the beam divergence of 50 mm diameter at the spherical mirror 2. In this case, the effect of improving resolution is remarkable in the monochromator of the present invention.

FIG. 9 shows the plane grating groove spacing of the present invention for reducing astigmatism for application to the grating of the Littrow monochromator shown in FIG. 3. Here, both distances r1 between the spherical mirror 2 and the entrance slit 1 and the distance r2 between the spherical mirror 2 and the exit slit are set to the distance of $R/2 \cos \theta$ to reduce the astigmatism of the spectral image. If $R = 630$ mm and $\theta = 7°$ in this case, $r1 = r2 = 317.66$ mm. In this optical configuration, the groove spacing $\sigma w$ at the position of the distance W (mm) from the center employs the varied-spaced groove spacing of $$\sigma w = 1/1,200(1 - 1.44 \times 10^{-4}W + 2.61 \times 10^{-6}W^2 - 9.19 \times 10^{-9}W^3) \text{ (mm)}$$

shown in FIG. 9 with the center groove spacing $\sigma o$ being 1/1200 mm, the astigmatism, coma-type aberration and spherical aberration of the spectral image can be reduced for the first order spectrum of a wavelength of 500 nm.

The above mentioned formulas for $\sigma w$ can be generalized as:

$$\sigma w = \sigma o(1 + \Sigma K_i W^i) = \sigma o(1 + AW + BW^2 + CW^3 + DW^4 + \ldots)$$

where K, A, B, C, D are constants and i represents an integer so that at least one $K_i$ value is a constant which is not zero to reduce aberration of the spectral image.

Figure 10A:
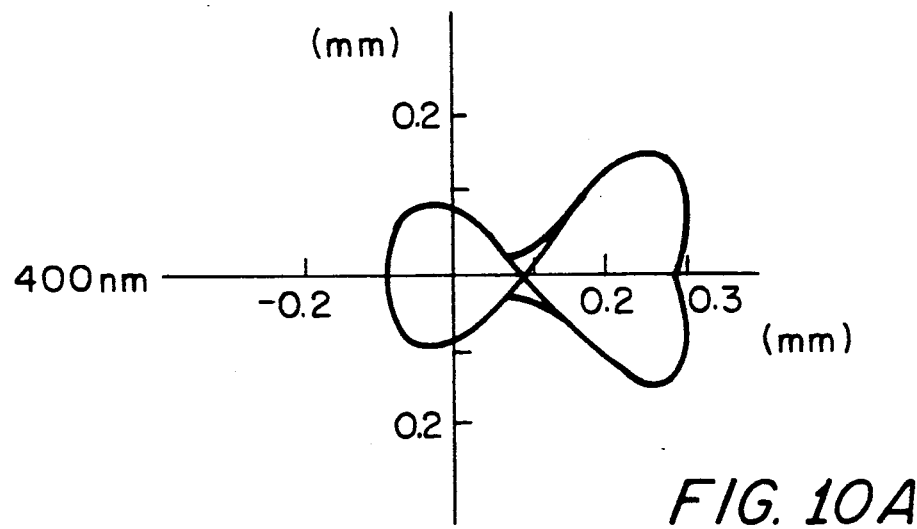
FIG. 10 is an explanatory view showing the spectral image focusing property by use of the diffraction grating for reducing the astigmatism in the Littrow monochromator of the present invention (where the x axis corresponds to the direction of spectral dispersion and the y axis corresponds to normal dispersion on the exit plane).
Figure 10B:
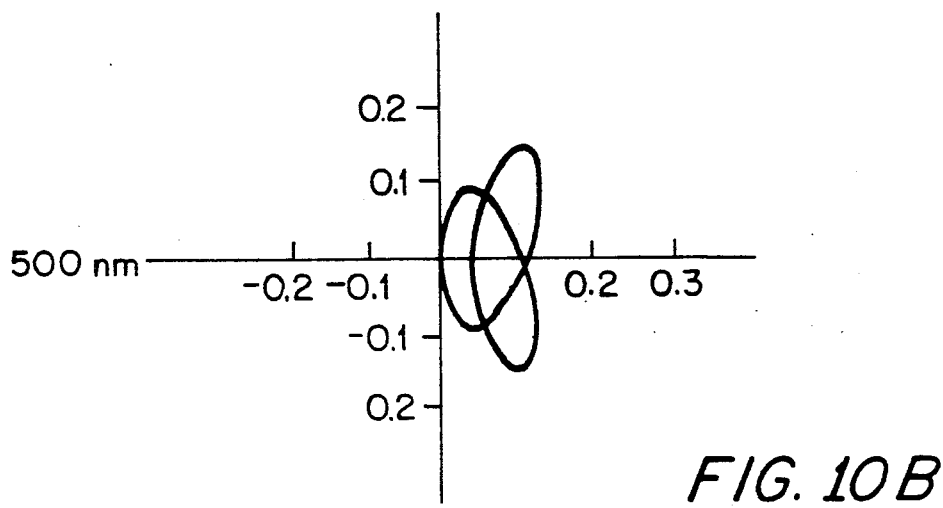
Figure 10C:
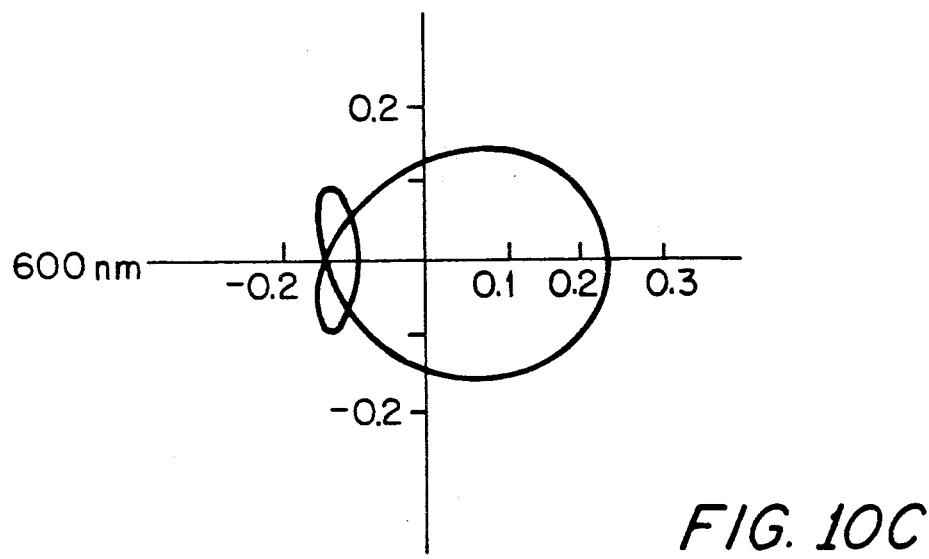

FIG. 10 shows the spectral images in the case where the plane grating with the varied-spaced grooves of this invention is used for the first order spectrum at each of the wavelengths of 400, 500 and 600 nm with the beam divergence of 50 mm diameter at the spherical mirror 2. Whereas spectral focusing of the direction of spectral dispersion is not obtained due to defocus in the optical configuration without astigmatism by use of the conventional plane grating, approximate focal property can be observed for the design wavelength of 500 nm of the present invention. In this case, though the spectral focusing function drops due to defocus in the direction of spectral dispersion at 400 nm and 600 nm, the effect of reducing the astigmatism can be maintained.

In the plane grating monochromators using the spherical mirrors such as the Czerny-Turner monochromators and the Littrow monochromators, the present invention can eliminate and/or reduce various aberrations such as the coma-type aberration, spherical aberration, astigmatism, and the like, of the spectral image in an arbitrary wavelength region by using the varied-spaced groove spacings for the diffraction grating. Such a diffraction grating can be produced with accuracy of the same level as that of the equally spaced groove grating by use of the ruling engine which can change arbitrarily the groove spacings through numerical control. Accordingly, the present invention can accomplish a plane grating monochromator having high resolution and high throughput without using an aspheric mirror such as a paraboloidal mirror which is difficult to produce and is very expensive.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A monochromator comprising:
   means forming an entrance slit for a beam of light;
   means forming an exit slit for a beam of light;
   spherical mirror means in an optical path between said entrance slit and said exit slit for converting a diverging beam leaving the entrance slit into a parallel beam;
   a plane grating in the optical path for converting the parallel beam into a monochromatic component parallel beam;
   said spherical mirror means further converting the monochromatic component parallel beam into a converging focused beam passing through the exit slit; thereby producing a spectral image and
   said plane grating including varied-spaced, straight and parallel grooves.

2. A monochromator according to claim 1 of a Czerny-Turner type having two spherical mirrors as said spherical mirror means.

3. A monochromator according to claim 2, wherein said grating has a center, and wherein said spherical mirrors have the same radius of curvature and are arranged so that the incidence angles to the mirrors are the same for a ray that is diffracted at the center of the grating.

4. A monochromator according to claim 1 of a Littrow type having only a single spherical mirror as said spherical mirror means.

5. In a monochromator according to claim 1, said plane grating having a center and having a groove spacing $\sigma w$ at the position of distance W in a direction perpendicular to said grooves from the center of the grating set to satisfy the relation $$\sigma w = \sigma o(1 + \Sigma K_i W^i)$$

with respect to the groove spacing at the center $\sigma o$ when i representing an integer so that at least one $K_i$ value is a constant which is not zero to reduce aberration of the spectral image.

6. A monochromator according to claim 5, wherein at least $K_2$ is a constant which is not zero to reduce coma-type aberration of a spectral image.

7. A monochromator according to claim 5, wherein at least $K_3$ is a constant which is not zero to reduce spherical aberration of a spectral image.

* * * * *